May 16, 1967 W. J. STROH 3,320,361

TELEVISION RECEIVER INCLUDING A CRISPENER NETWORK COMPRISING A SERIES CONNECTED INDUCTOR AND VARIABLE RESISTOR

Filed Nov. 27, 1961

INVENTOR.
Walter J. Stroh
BY
Cornelius J. O'Connor
Atty.

United States Patent Office 3,320,361

Patented May 16, 1967

3,320,361

TELEVISION RECEIVER INCLUDING A CRISPENER NETWORK COMPRISING A SERIES CONNECTED INDUCTOR AND VARIABLE RESISTOR

Walter J. Stroh, Barrington, Ill., assignor to Zenith Radio Corporation, a corporation of Delaware Filed Nov. 27, 1961, Ser. No. 154,954
1 Claim. (Cl. 178—7.3)

This invention relates in general to television receivers and in particular to a novel detector circuit for effecting a crispening of a reproduced image.

To realize the full capabilities of a television receiver in reproducing the most desirable picture, regardless of the strength or noise content of the received signal, receivers have been equipped with a control for adjusting the crispness of the picture, i.e., the degree of contrast between light and dark areas. Care should be exercised, however, to avoid confusing the operation of a crispener circuit with that of the conventional contrast control. The latter merely controls the amplitude of the video signal applied to the intensity control electrode of the picture tube, in other words, the drive to that electrode. A crispener control, on the other hand, changes the frequency content of the video signal. Under weak signal conditions, for example, a more pleasing picture is obtained if the contrast is softened. On the other hand, when a strong signal is available, an excellent picture is obtained if the transition between light and dark areas is sharpened. The video information required to produce this sharp transition is borne principally by the mid-range frequency components of the video signal. In strong signal areas, therefore, the best picture is obtained by fully utilizing, to the point of emphasis, the mid-range of the video signal. Stated another way, under weak signal conditions it is desirable to reduce the mid-range response by compressing the bandwidth of the video signal. On the other hand, upon receipt of strong signals, expansion of the bandwidth by emphasizing the mid-range is desirable.

In this matter of video bandwidth control for obtaining picture crispening, the prior art has invariably resorted to arrangements for controlling the frequency response of the video amplifier output. For the most part, such arrangements contemplate adjustable resistance and/or reactance elements disposed in the plate circuit of the video amplifier so that any change in bandwidth is confined to that one stage. Moreover, whenever the control is repositioned, the level of the D.C. plate voltage as well as the response of the video amplifier is changed. A particular shortcoming in this practice is manifest in the case where a circuit having its operation conditioned upon the D.C. level of the video plate voltage is connected to the video output. For example, a direct coupling between the video plate circuit and the intensity control electrode of the picture tube is frequently employed to avoid the necessity of providing D.C. restoration. In such a case, any adjustment of the crispener circuit necessarily changes the D.C. level of the video amplifier output circuit. As a result the intensity control electrode of the picture tube is subjected to different D.C. operating levels whenever the viewer decides to change the degree of picture crispness, which might be each time he selects a new channel.

Another example of a D.C. utilization circuit currently employed in many television receivers is the AGC system described in United States Patent No. 2,915,583 which issued on December 1, 1959 to Robert Adler et al. and now widely used in the industry. In that AGC system, which is described below, use is made of the D.C. potential of the video plate circuit to provide biasing voltage for one of the control electrodes of the AGC amplifier. If resort to a prior art crispener circuit is had in a receiver employing this AGC system, the gain of the radio frequency and intermediate frequency amplifiers would, in part, be determined by the setting of the picture crispness control rather than being principally a function of signal strength.

Insofar as the frequency response or bandwidth of the video signal is concerned, it is also recognized that such can also be adjusted by operating upon the IF stage itself. However, since the IF amplifier of a television receiver translates signals in the order of 40 megacycles, and since the tuning of the IF stage is rather critical, it is neither advisable nor prudent to provide this stage directly with a viewer adjustable control. Moreover, such a control together with its associated leads poses feedback and oscillation problems. As a result, viewer actuated controls for adjusting the overall IF response have been avoided.

It is therefore a principal object of the invention to provide a circuit which achieves crispening of a reproduced television image by simultaneously adjusting the bandwidth of two intercoupled circuits.

It is a specific object of the invention to provide an adjustable detector load circuit which determines the frequency response of the IF stage as well as the detector.

It is also an object of the invention to provide a crispener circuit which readily permits the use of D.C. utilization circuits in the video amplifier output circuit.

It is also an object of the invention to provide an improved crispener circuit readily adaptable to most television receiver designs and characterized by an inexpensive construction.

A television receiver constructed in accordance with the invention comprises a tuned IF amplifying stage for developing a composite television signal and means, including a video detector which is coupled to the output of the IF stage and is responsive to the composite television signal, for developing a detected composite video signal. The receiver further includes a video amplifier which has an input circuit coupled to the video detector and an output circuit for developing an output signal having video components and a D.C. component from the detected signal. Finally, crispener network means are included in the video detector. The crispener comprises an inductor and a variable resistor connected in series to constitute the output load and the principle video bandwidth determining parameter of the detector. This inductor and variable resistor adjust the frequency response of both the video detector and the IF stage while maintaining the D.C. component of the output signal substantially constant.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

Figures 1, 2, 3:
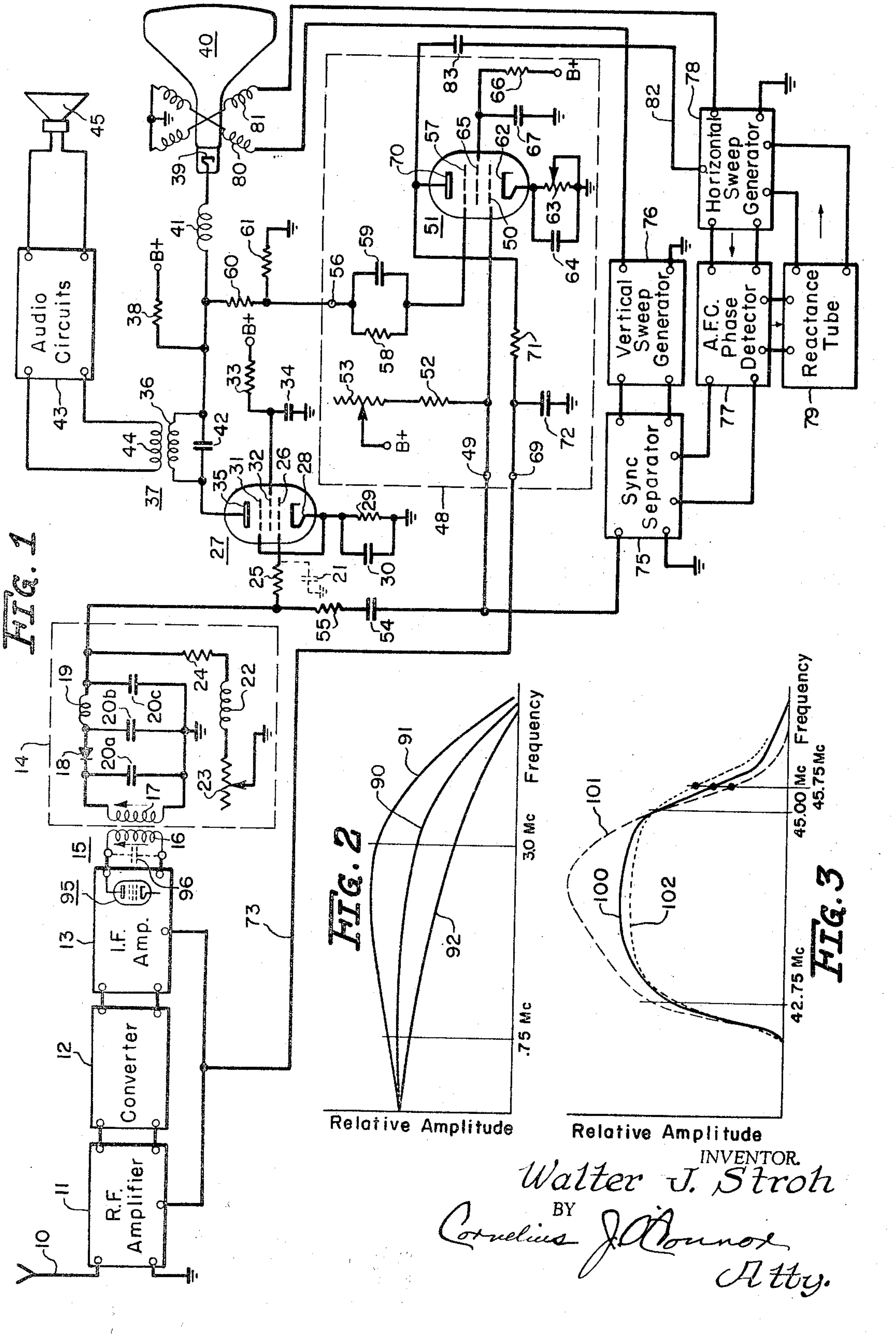
FIGURE 1 is a schematic diagram of a television receiver embodying the invention.
FIGURE 2 is a graphical representatiton of the frequency response of the detector circuit shown in FIGURE 1 under different load conditions.
FIGURE 3 is a graphical representation of the overall response of the IF amplifier stage shown in FIGURE 1 under different detector load conditions.

The television receiver illustrated in FIGURE 1 comprises an antenna 10 coupled to a radio-frequency amplifier 11 which, in turn, is coupled to a converter stage 12. Converter 12 is coupled to an intermediate-frequency amplifier 13 which may employ any desired number of stages and includes an output stage comprising an amplifier 95. The output circuit of amplifier 95 is coupled to a detector, located within the dashed line enclosure 14, by an IF transformer 15. A tunable primary 16 of transformer 15 together with the output capacitance of the IF output stage, which is shown in broken-line construction and identified by reference numeral 96, comprise a tuned output circuit for amplifier 95. A tunable secondary 17 of transformer 15 comprises an input circuit for detector 14.

In addition to a diode 18, detector 14 includes a series peaking coil 19 and tuning and filter capacitors 20*a*, 20*b*, 20*c*. Detector 14 also includes a crispener circuit which comprises the series combination of an inductor 22, in the role of a shunt peaking coil, and an adjustable resistor 23. Inductor 22 and resistor 23 constitute an adjustable load circuit for detector 14 which, in a manner more fully detailed below, determines the frequency response of IF stage 13 as well as detector 14. A fixed resistor 24, also included in the load circuit of detector 14, serves as the limiting resistive load when adjustable resistor 23 is reduced to its minimum value.

The output of video detector 14 is coupled through a resistor 25 to the control grid 26 of a pentode video amplifier 27. The input capacitance of amplifier 27 together with stray capacitances attributable to the leads and components employed to couple the load circuit of detector 14 to control grid 26 is represented by broken-line construction and identified by reference numeral 21. The cathode 28 of the video amplifier is returned to ground through a biasing circuit comprising a resistor 29 and a shunt capacitor 30. The suppressor electrode 31 of the amplifier is returned to cathode 28 while the screen electrode 32 is connected to a source of positive potential B+ through a voltage dropping resistor 33 which is by-passed to ground by a capacitor 34. The anode 35 of amplifier 27 is connected to a source of positive potential designated B+ through the primary winding 36 of a sound take-off transformer 37 and a load resistor 38. The juncture of load resistor 38 and primary winding 36 is directly connected to an intensity modulating electrode 39 of an image reproducer 40 through a peaking coil 41.

A capacitor 42 is connected across transformer primary 36 to form a parallel resonant circuit tuned to a frequency corresponding to the difference between the video signal carrier and the sound signal carrier for deriving intercarrier sound signals. The output of circuit 36, 42 is coupled through the secondary winding 44 of transformer 37 to the audio circuits 43 for demodulation and amplification. The output of audio circuits 43, in turn, is coupled to a loudspeaker 45.

The television receiver of FIGURE 1 also includes an automatic gain control system which is shown within the broken-line enclosure 48 and which is similar in many respects to the AGC system described in the previously mentioned U. S. Patent to Robert Adler et al. This AGC system is provided with an input terminal 49 which is connected to the control grid 50 of an AGC amplifier tube 51. Control grid 50 is connected to a biasing circuit comprising a resistor 52 and a potentiometer 53, a movable tap of which is returned to a source of B+. Terminal 49 is also coupled to the output of detector 14 through a coupling capacitor 54 and a resistor 55.

A second input terminal 56 is connected to a second control grid 57 of amplifier 51 through a resistor 58 paralleled by a capacitor 59 and is also connected to the junction of a pair of voltage divider resistors 60, 61 which, in turn, are connected between the anode terminal of load resistor 38 and ground. The cathode 62 of amplifier 51 is connected to ground through a variable resistor 63 which is shunted by a bypass capacitor 64. The screen electrode 65 is connected to B+ through a resistor 66 which is bypassed to ground through a capacitor 67. An output terminal 69, coupled to the anode 70 of amplifier 51 by an integrating network comprising a resistor 71 and a capacitor 72, is connected to input circuits of RF amplifier 11 and IF amplifier 13 via a bus 73.

The output of detector 14 is also coupled to the input circuit of a synchronizing (sync) signal separator 75 which has one output circuit coupled to a vertical frequency sweep generator 76 and a second output coupled to an automatic frequency control phase detector 77. A comparison signal for phase detector 77 is derived from an output circuit of the horizontal frequency sweep generator 78. The output of phase detector 77 is applied to a reactance tube control circuit 79 which, in turn, is coupled to horizontal sweep generator 78. Sweep generators 76, 78 are coupled, respectively, to the scanning coils 80, 81 of a deflection system associated with picture tube 40. An auxiliary output circuit of horizontal sweep generator 78, constituting a source of gating potential, is coupled to anode 70 of AGC amplifier 51 by the lead 82 and a capacitor 83.

Except for the load circuit of detector 14, the television receiver illustrated in FIGURE 1 is conventional; accordingly, only a brief description of its operational characteristics is deemed necessary. A transmitted signal intercepted by antenna 10 is amplified in RF amplifier 11 and applied to converter 12 wherein the received signal is heterodyned to furnish an intermediate frequency signal in the 40 mc. range. This IF signal is amplified in stage 13 and applied to detector 14 through transformer 15. The operation of this detector load circuit and the manner in which it effects crispening of a reproduced image is considered in detail below. For the moment, suffice it to say that detector 14 develops a composite video signal of negative polarity which is applied to video amplifier 27, to AGC system 48, and also to sync seperator 75. An amplified version of the composite video signal, but of positive polarity, appears at anode 35 of amplifier 27 and is applied to cathode 39 of picture tube 40 to intensity-modulate the electron beam of the picture tube in known fashion. While a D.C. connection is employed between video amplifier 27 and cathode 39, it is recognized that A.C. coupling can also be used. A portion of the positive polarity video signal is also applied to control grid 57 of AGC amplifier 51. The inter-carrier sound signals developed in tuned circuit 36, 42 are supplied to audio circuits 43 which develop the sound portion of the television broadcast.

To develop an AGC signal, a negative polarity video signal from detector 14 is applied to control grid 50 of AGC amplifier 51. Simultaneously, a video signal having a D.C. component, as well as an A.C. component of positive polarity, is applied to second control grid 57. The magnitude of the D.C. component is determined, of course, by divider resistors 60, 61 and constitutes a biasing potential for grid 57. This bias voltage together with the bias developed across adjustable cathode resistor 63 establishes an operating threshold for the AGC amplifier. Biased in this fashion, no signal appears at anode 70 of amplifier 51 until the composite video signal exceeds a predetermined peak amplitude. More particularly, when the positive going sync tips of the signal applied to grid 57 exceed the threshold bias on grid 57 and occur in time coincidence with the gating pulses furnished by horizontal sweep generator 78, amplifier 51 is rendered conductive and an output signal is developed at anode 70. This signal is then integrated by resistor-capacitor circuits 71, 72 to develop a gain control potential for controlling the gain of amplifiers 11, 13.

The sync signal components of the detected composite video signal are separated in system 75 and applied to sweep signal generating circuits 76–79 of the receiver to control the phase and frequency of the scanning signals generated therein. The scanning signals, in turn, are supplied to deflection coils 80, 81 to control the scansion of the electron beam across the screen of picture tube 40, and in a conventional and well known manner.

The operation of the crispener circuit and the manner in which it effects crispening of a reproduced image is best understood by first considering the video response of the output circuit of detector 14 when subjected to different load conditions. As previously noted the frequency components in the mid-range of the video signal are principally determinative of the degree of picture crispening that can be achieved. This band of frequencies is emphasized in the following manner.

Consider first that curve 90 of FIGURE 2 represents the frequency response of the detector circuit under normal operating conditions. Such a curve obtains when IF stage 13 and tunable inductors 16, 17 are adjusted to provide the overall frequency response corresponding to curve 100 in FIGURE 3. Accordingly, when it is desired to emphasize the mid-range response of the detector the value of resistor 23 is reduced so that peaking coil 22 becomes more effective in determining the detector response. As a result the mid-range is emphasized and detector response now assumes the configuration of curve 91 in FIGURE 2. Simultaneously, due to the reflection of this impedance change in the tuned output circuits 16, 96 of amplifier 95, a corresponding change in the mid-range of the overall IF response is produced, see dashed-line curve 101 in FIGURE 3. Note that the 45.75 video carrier has been attenuated and that the band extending from 45 mc. to beyond 42.75 has been emphasized. This emphasized band embraces those modulation products of the upper sideband of the video carrier corresponding to the video modulating frequencies extending approximately from .75 mc. to beyond 3 mc. In order to clarify what at first blush appears contradictory here, recall that the local oscillator signal is located above the video carrier (by 45.75 mc.). Thus the higher frequency modulation products of the video carrier are converted to lower frequency IF signals.

When the resistive component of the detector load circuit is increased as by increasing the value of resistor 23, capacitance 21 becomes more effective in determining the frequency response of the detector, and inductor 22 less effective, with a resultant narrowing of the passband as illustrated by curve 92 of FIGURE 2. Since this change in detector load resistance is also reflected into the tuned output circuits 16, 96 of amplifier 95, a corresponding compression of the overall IF response obtains, as shown by dotted-line curve 102 of FIGURE 3.

In order to afford a more complete illustration of the invention, and without restricting its generality, suitable impedance values for certain components associated with detector 14 are set forth below.

To recapitulate, when the resistive component of the detector load circuit is reduced the bandwidth of the detector output is increased and the overall frequency response of IF stage 13 is altered in such a fashion as to emphasize the mid-range of the IF signal. On the other hand, increasing the resistive portion of the detector load circuit narrows the bandwidth of the detector output and alters the overall frequency response so as to reduce the mid-range response of the IF amplifier.

| | |
|---|---|
| Diode **18** | Type 1N60 or equivalent. |
| Tube **95** | Type 6EJ7/EF184 or equivalent. |
| Tube **27** | Pentode section of type 6GN8 or equivalent. |
| Primary winding **16** | Approx. 2.2 μh @ 7.9 mc. |
| Secondary winding **17** | Approx. 1.7 μh @ 7.9 mc. |
| Coil **19** | 90 μh. |
| Coil **22** | 170 μh. |
| Capacitor **20*a*** | 5.5 μμf. |
| Capacitor **20*b*** | 4.7 μμf. |
| Capacitor **20*c*** | 4.7 μμf. |
| Capacitance **21** | Approx. 13 μμf. (includes 11 μμf. input capacitance of tube **27**). |
| Capacitor **30** | .033 μf. |
| Capacitor **54** | .1 μf. |
| Capacitance **96** | Approx. 5.5 μμf. (includes 3 μμf. output capacitance of tube **95**). |
| Resistor **23** | 1500 ohms. |
| Resistor **24** | 1200 ohms. |
| Resistor **25** | 330 ohms. |
| Resistor **29** | 15 ohms. |
| Resistor **55** | 39,000 ohms. |

The invention thus provides a crispener arrangement comprising an adjustable load circuit for the video detector of the receiver which determines not only the frequency response of the video detector but also the response of the IF amplifier. Moreover, by performing crispening in this fashion and in the detector circuit, the D.C. level of subsequent stages does not become a function of crispening. Accordingly, D.C. utilization circuits may readily be employed in subsequent stages, if desired.

While a particular embodiment of the present invention has been shown and described, it is apparent that changes and modifications may be made therein without departing from the invention in its broader aspects. The aim of the appended claim, therefore, is to cover all such changes and modifications as fall within the true spirit and scope of the invention.

I claim:

A television receiver comprising:

a tuned IF amplifying stage for developing a composite television signal;

means, including a video detector, coupled to the output of said IF stage and responsive to said composite television signal for developing a detected composite video signal;

a video amplifier having an input circuit coupled to said video detector and an output circuit for developing from said detected signal an output signal having video components and a D.C. component;

and means including a crispener network, included in said video detector, comprising an inductor and a variable resistor connected in series and constituting the output load and the principal video bandwidth determining parameter of said detector for adjusting the frequency response of both said video detector and said IF stage while maintaining the D.C. component of said output signal substantially constant.

References Cited by the Examiner

UNITED STATES PATENTS

| | | | |
|---|---|---|---|
| 2,514,112 | 7/1950 | Wright et al. | 178—7.5 |
| 2,522,967 | 9/1950 | Shaw | 178—7.5 |
| 2,615,089 | 10/1952 | Rogers | 178—7.5 |
| 2,627,022 | 1/1953 | Anderson | 178—7.3 |
| 2,652,450 | 9/1953 | Tourshou | 178—7.3 |
| 2,681,948 | 6/1954 | Avins | 178—7.3 |
| 2,814,671 | 11/1957 | Adler | 178—7.35 |

FOREIGN PATENTS

| | | |
|---|---|---|
| 1,193,120 | 10/1959 | France. |
| 462,228 | 3/1937 | Great Britain. |

OTHER REFERENCES

D. G. Fink: Television Engineering Handbook, pp. 13–16, 1957.

JOHN W. CALDWELL, *Primary Examiner.*

JOHN P. WILDMAN, D. REDINBAUGH, M. GINSBURG, R. MURRAY, J. McHUGH, R. L. RICHARDSON, *Assistant Examiners.*